United States Patent
Swanson et al.

(10) Patent No.: US 11,878,461 B2
(45) Date of Patent: Jan. 23, 2024

(54) CORE-SHELL FILAMENT FOR USE IN EXTRUSION-BASED ADDITIVE MANUFACTURING SYSTEMS AND METHOD OF PRINTING PARTS

(71) Applicant: Stratasys, Inc., Eden Prarie, MN (US)

(72) Inventors: William J. Swanson, St. Paul, MN (US); William R. Priedeman, Jr., Long Lake, MN (US)

(73) Assignee: Stratasys, Inc., Eden Prairie, MN (US)

( * ) Notice: Subject to any disclaimer, the term of this patent is extended or adjusted under 35 U.S.C. 154(b) by 438 days.

(21) Appl. No.: 17/290,852

(22) PCT Filed: Nov. 4, 2019

(86) PCT No.: PCT/US2019/059676
§ 371 (c)(1),
(2) Date: May 3, 2021

(87) PCT Pub. No.: WO2020/093049
PCT Pub. Date: May 7, 2020

(65) Prior Publication Data
US 2021/0387402 A1  Dec. 16, 2021

Related U.S. Application Data

(60) Provisional application No. 62/754,986, filed on Nov. 2, 2018.

(51) Int. Cl.
*B29C 64/118* (2017.01)
*D01F 8/12* (2006.01)
(Continued)

(52) U.S. Cl.
CPC .............. *B29C 64/118* (2017.08); *D01F 8/12* (2013.01); *D01F 8/14* (2013.01);
(Continued)

(58) Field of Classification Search
None
See application file for complete search history.

(56) References Cited

U.S. PATENT DOCUMENTS

| | | |
|---|---|---|
| 5,503,785 A | 4/1996 | Crump et al. |
| 5,866,058 A | 2/1999 | Batchelder et al. |
| (Continued) | | |

FOREIGN PATENT DOCUMENTS

| | | |
|---|---|---|
| WO | 2017112689 A1 | 6/2017 |
| WO | 2018075320 A1 | 4/2018 |
| (Continued) | | |

OTHER PUBLICATIONS

International Search Report and Written Opinion from PCT/US2019/059676, filed Nov. 4, 2019. 12 pages.
(Continued)

*Primary Examiner* — Mohammad M Ameen
(74) *Attorney, Agent, or Firm* — Peter J. Ims; Westman, Champlin & Koehler, P.A.

(57) ABSTRACT

A filament for use in an extrusion-based additive manufacturing system includes an elastomeric core and a harder, non-elastomeric shell. The core compositionally comprising an elastomeric core material having a flexural modulus of less than 31,000 psi and a durometer of less than 80 Shore. The shell overlays the core portion and compositionally comprises a non-elastomeric thermoplastic shell material that is substantially miscible with the elastomeric core material, wherein the core material and the shell material have the same monomer chemistry. The non-elastomeric thermoplastic shell material has a flexural modulus that is greater than the flexural modulus of the elastomeric core material by at least a factor of five, wherein the shell provides sufficient strength or stiffness to the filament such (Continued)

that filament can be utilized as a feedstock in the extrusion-based additive manufacturing system.

29 Claims, 5 Drawing Sheets

(51) Int. Cl.
| | |
|---|---|
| *D01F 8/14* | (2006.01) |
| *B33Y 10/00* | (2015.01) |
| *B33Y 70/10* | (2020.01) |
| *B29K 21/00* | (2006.01) |
| *B29K 77/00* | (2006.01) |

(52) U.S. Cl.
CPC .... *B29K 2021/003* (2013.01); *B29K 2077/00* (2013.01); *B29K 2995/0046* (2013.01); *B33Y 10/00* (2014.12); *B33Y 70/10* (2020.01)

(56) References Cited

U.S. PATENT DOCUMENTS

| | | | |
|---|---|---|---|
| 6,004,124 | A | 12/1999 | Swanson et al. |
| 6,054,077 | A | 4/2000 | Comb et al. |
| 6,547,995 | B1 | 4/2003 | Comb |
| 6,814,907 | B1 | 11/2004 | Comb |
| 6,923,634 | B2 | 8/2005 | Swanson et al. |
| 7,122,246 | B2 | 10/2006 | Comb et al. |
| 7,384,255 | B2 | 6/2008 | LaBossiere et al. |
| 7,491,356 | B2 | 2/2009 | Heikkila |
| 7,604,470 | B2 | 10/2009 | LaBossiere et al. |
| 7,625,200 | B2 | 12/2009 | Leavitt |
| 7,896,209 | B2 | 3/2011 | Batchelder et al. |
| 8,153,182 | B2 | 4/2012 | Comb et al. |
| 8,419,996 | B2 | 4/2013 | Swanson et al. |
| 8,647,102 | B2 | 2/2014 | Swanson et al. |
| 8,926,882 | B2 | 1/2015 | Batchelder et al. |
| 9,364,986 | B1 | 6/2016 | Patterson |
| 10,011,922 | B2 | 7/2018 | Graley et al. |
| 10,428,164 | B2 | 10/2019 | Wang et al. |
| 10,563,324 | B2 | 2/2020 | Graley et al. |
| 11,207,831 | B2 | 12/2021 | Lewis et al. |
| 2009/0274540 | A1 | 11/2009 | Batchelder et al. |
| 2010/0096485 | A1 | 4/2010 | Taatjes et al. |
| 2010/0096489 | A1 | 4/2010 | Taatjes et al. |
| 2012/0070619 | A1 | 3/2012 | Mikulak et al. |
| 2012/0231225 | A1 | 9/2012 | Mikulak et al. |
| 2013/0252497 | A1 | 9/2013 | Schiebel et al. |
| 2014/0361460 | A1* | 12/2014 | Mark ............... B29C 64/141 264/248 |
| 2016/0002468 | A1 | 1/2016 | Heikkila et al. |
| 2016/0024293 | A1 | 1/2016 | Nestle et al. |
| 2016/0082658 | A1 | 3/2016 | Swartz et al. |
| 2016/0122541 | A1* | 5/2016 | Jaker ............... B29C 64/106 525/392 |
| 2016/0177078 | A1 | 6/2016 | Naito et al. |
| 2016/0251486 | A1* | 9/2016 | Cernohous ......... C08J 5/0405 264/308 |
| 2017/0268133 | A1 | 9/2017 | Graley et al. |
| 2018/0043627 | A1 | 2/2018 | Barclay et al. |
| 2018/0202076 | A1 | 7/2018 | Van Der Schaaf et al. |
| 2020/0181807 | A1 | 6/2020 | Graley et al. |

FOREIGN PATENT DOCUMENTS

| | | |
|---|---|---|
| WO | 2018106705 A1 | 6/2018 |
| WO | 2018108639 A1 | 6/2018 |
| WO | 2018112263 A1 | 6/2018 |
| WO | 2018162268 A1 | 9/2018 |
| WO | 2019025472 A1 | 2/2019 |
| WO | 2020093049 A1 | 5/2020 |

OTHER PUBLICATIONS https://www.fabbaloo.com/blog/2018/7/30/has-essentium-solved-the-flexible-3d-printing-problem.
https://www.amazon.com/Essentium-Flexible-Filament-1-75mm-Print/dp/B06W5DQ8ST.

* cited by examiner

CORE-SHELL FILAMENT FOR USE IN EXTRUSION-BASED ADDITIVE MANUFACTURING SYSTEMS AND METHOD OF PRINTING PARTS

CROSS-REFERENCE TO RELATED APPLICATION

This Application is a Section 371 National Stage Application of International Application No. PCT/US2019/059676, filed Nov. 4, 2019 and published as WO 2020/093049 A1 on May 7, 2020, in English, which claims the benefit of U.S. Provisional Application Ser. No. 62/754,986 which was filed Nov. 2, 2018; the contents of all of which are hereby incorporated by reference in their entirety.

BACKGROUND

The present disclosure relates to additive manufacturing materials and techniques for printing parts with the additive manufacturing system. In particular, the present disclosure relates to a filament having an elastomeric core and a shell of a harder, non-elastomeric miscible polymer that can be used to print parts with elastomeric physical properties. All references disclosed herein are incorporated by reference.

Additive manufacturing, also called 3D printing, is generally a process in which a part is built by adding material to form the part rather than subtracting material as in traditional machining. Using one or more additive manufacturing techniques, a three-dimensional solid part of virtually any shape can be printed from a digital model of the part by an additive manufacturing system, commonly referred to as a 3D printer. A typical additive manufacturing work flow includes slicing a three-dimensional computer model into thin cross sections defining a series of layers, translating the result into two-dimensional position data, and transmitting the data to a 3D printer which manufactures a three-dimensional structure in an additive build style. Additive manufacturing entails many different approaches to the method of fabrication, including material extrusion, ink jetting, selective laser sintering, powder/binder jetting, electron-beam melting, electrophotographic imaging, and stereolithographic processes.

In a typical extrusion-based additive manufacturing system (e.g., fused deposition modeling systems developed by Stratasys, Inc., Eden Prairie, MN), a 3D part may be printed from a digital representation of the printed part by extruding a viscous, flowable thermoplastic or filled thermoplastic material from a print head along toolpaths at a controlled extrusion rate. The extruded flow of material is deposited as a sequence of roads onto a substrate, where it fuses to previously deposited material and solidifies upon a drop in temperature. The print head includes a liquefier which receives a supply of the thermoplastic material in the form of a flexible filament, and a nozzle tip for dispensing molten material. A filament drive mechanism engages the filament such as with a drive wheel and a bearing surface, or pair of toothed-wheels, and feeds the filament into the liquefier where the filament is heated to a molten pool. The unmelted portion of the filament essentially fills the diameter of the liquefier tube, providing a plug-flow type pumping action to extrude the molten filament material further downstream in the liquefier, from the tip to print a part, to form a continuous flow or toolpath of resin material. The extrusion rate is unthrottled and is based only on the feed rate of filament into the liquefier, and the filament is advanced at a feed rate calculated to achieve a targeted extrusion rate, such as is disclosed in Comb U.S. Pat. No. 6,547,995.

In a system where the material is deposited in planar layers, the position of the print head relative to the substrate is incremented along an axis (perpendicular to the build plane) after each layer is formed, and the process is then repeated to form a printed part resembling the digital representation. In fabricating printed parts by depositing layers of a part material, supporting layers or structures are typically built underneath overhanging portions or in cavities of printed parts under construction, which are not supported by the part material itself. A support structure may be built utilizing the same deposition techniques by which the part material is deposited. A host computer generates additional geometry acting as a support structure for the overhanging or free-space segments of the printed part being formed. Support material is then deposited pursuant to the generated geometry during the printing process. The support material adheres to the part material during fabrication and is removable from the completed printed part when the printing process is complete.

A multi-axis additive manufacturing system may be utilized to print 3D parts using fused deposition modeling techniques. The multi-axis system may include a robotic arm movable in six degrees of freedom. The multi-axis system may also include a build platform movable in two or more degrees of freedom and independent of the movement of the robotic arm to position the 3D part being built to counteract effects of gravity based upon part geometry. An extruder may be mounted at an end of the robotic arm and may be configured to extrude material with a plurality of flow rates, wherein movement of the robotic arm and the build platform are synchronized with the flow rate of the extruded material to build the 3D part. The multiple axes of motion can utilize complex tool paths for printing 3D parts, including single continuous 3D tool paths for up to an entire part, or multiple 3D tool paths configured to build a single part. Use of 3D tool paths can reduce issues with traditional planar toolpath 3D printing, such as stair-stepping (layer aliasing), seams, the requirement for supports, and the like. Without a requirement to slice a part to be built into multiple layers each printed in the same build plane, the geometry of the part may be used to determine the orientation of printing.

SUMMARY

An aspect of the present disclosure relates to a filament for use in an extrusion-based additive manufacturing system. The filament includes an elastomeric core compositionally comprising an elastomeric core material having a flexural modulus of less than 31,000 psi and a durometer of less than 80 Shore A, and a shell covering the core and having a thickness t, the shell compositionally comprising a non-elastomeric thermoplastic shell material that is substantially miscible with the elastomeric core material and has the same monomer chemistry as the elastomeric core material. The non-elastomeric thermoplastic shell material has a flexural modulus that is at least five times greater than the flexural modulus of the elastomeric core material and provides sufficient stiffness to the filament such that filament can be utilized as a feedstock in the extrusion-based additive manufacturing system.

Another aspect of the present disclosure is directed to a method of printing a part with an extrusion-based additive manufacturing system having an extrusion head. The method includes feeding a core-shell consumable filament to a print head, the filament having an elastomeric core and a harder, non-elastomeric shell overlaid on the core. The shell compositionally comprising a non-elastomeric thermoplastic material that is substantially miscible with the elastomeric core, wherein the thermoplastic material has a flexural modulus that is greater than a flexural modulus of the elastomeric core by at least a factor of five. The method includes heating the fed core-shell consumable filament in the print head to form a molten material and mixing the molten material to a substantially uniform composition within the print head. The method includes depositing the substantially uniform molten material as extruded roads to form at least a portion of the part such that the part has elastomeric properties.

Definitions

Unless otherwise specified, the following terms used in this specification have the meanings provided below.

The term "filament" used herein refers to a length of consumable material that is configured to be stored in a spooled configuration at a source, advanced through a 3D printer into a print head thereof, and heated to a molten state for extrusion from the print head. The filament can have a cylindrical configuration where the average diameter ranges from about 1.0 millimeter (about 0.04 inches) to about 3.0 millimeters (about 0.12 inches), from about 1.0 millimeter (about 0.04 inches) to about 1.5 millimeters (about 0.06 inches) or from about 1.5 millimeters (about 0.06 inches) to about 2.0 millimeters (about 0.08 inches). The filament can also have a ribbon configuration with an aspect ratio (ratio of width by thickness) ranging from about 2:1 to about 10:1 and more particularly from about 2:1 to about 5:1. Examples of suitable dimensions for width range from about 1.0 millimeter (about 0.04 inches) to about 10.2 millimeters (about 0.40 inches), from about 2.5 millimeters (about 0.10 inches) to about 7.6 millimeters (about 0.30 inches), or about 3.0 millimeters (about 0.12 inches) to about 5.1 millimeters (about 0.20 inches). Examples of suitable dimensions for the thickness range from about 0.08 millimeters (about 0.003 inches) to about 1.5 millimeters (about 0.06 inches), from about 0.38 millimeters (about 0.015 inches) to about 1.3 millimeters (about 0.05 inches), or from about 0.51 millimeters (about 0.02 inches) to about 1.0 millimeters (about 0.04 inches).

The terms "core portion", "shell portion", "shell" and "core" of a filament refer to relative locations along a cross-section of the filament that is orthogonal to a longitudinal axis of the filament, where the core is an inner portion relative to the shell. Unless otherwise stated, these terms are not intended to imply any further limitations on the cross-sectional characteristics of the portions.

The term "flexural modulus" is an intensive property of a material that is computed as the ratio of stress to strain in flexural deformation, or the tendency for a material to resist bending. It is determined from the slope of a stress-strain curve produced by a flexural test (such as ASTM D790), and uses units of force per area. As used herein, flexural modulus and Young's modulus can be used interchangeably.

The term "three-dimensional object" refers to any object built using an extrusion-based additive manufacturing technique and includes parts and support structures that are printed using extrusion-based additive manufacturing techniques.

The terms "about" and "substantially" are used herein with respect to measurable values and ranges due to expected variations known to those skilled in the art (e.g., limitations and variabilities in measurements).

DETAILED DESCRIPTION

Figure 1:
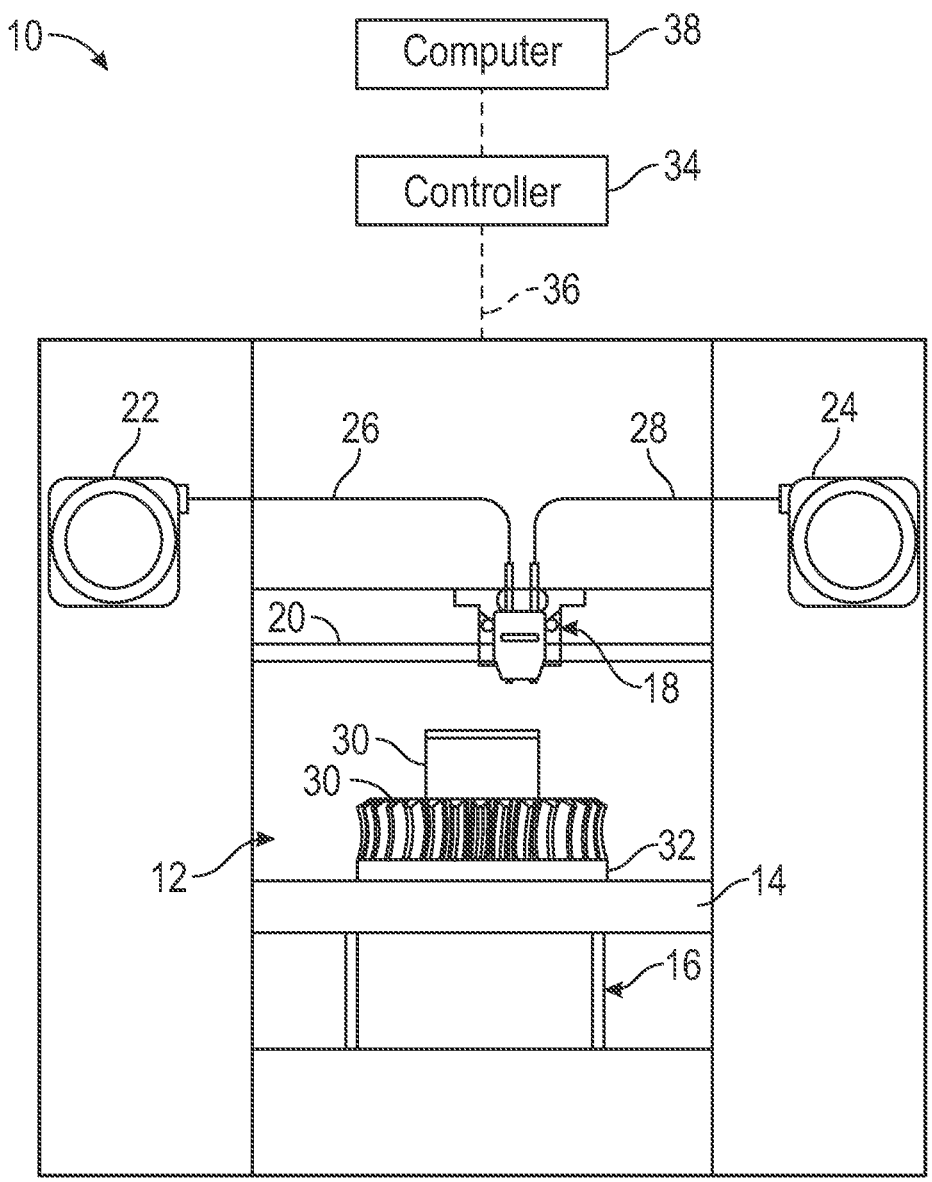
FIG. 1 is a front view of an exemplary additive manufacturing system configured to print parts with the use of consumable materials of the present disclosure.

The present disclosure is directed to elastomeric-based consumable filaments for use in extrusion-based 3D printers (also referred to as additive manufacturing systems) and a method of printing the consumable filaments. The filament of the present disclosure has an elastomeric core with a shell of a non-elastomeric, thermoplastic material that is substantially miscible with the elastomeric core material and having a higher flexural modulus relative to the elastomeric core. Utilizing a harder, non-elastomeric shell over an elastomeric core provides a stiffness to the elastomeric material that enables feeding the filament through the printer to a print head, as this core-shell elastomeric filament behaves as a harder material when moving from a source to the print head and when driven into a liquefier. Upon being heated to a flowable form, the core and shell materials can be mixed in the liquefier and extruded in layers to print a part, whereby a part is printed that has the physical properties of the elastomeric material.

The present disclosure is also directed to an extrusion-based additive manufacturing system configured to mix molten elastomeric core material and non-elastomeric, thermoplastic shell material into a substantially uniform composition prior to being extruded in a series of roads, such that the part has the physical properties that are substantially that of the neat elastomeric material. The present disclosure is also directed to a method of printing a part with an extrusion-based additive manufacturing system where a filament having an elastomeric core and a non-elastomeric, thermoplastic shell of a miscible material, with a flexural modulus that is higher than that of the elastomeric material, is heated into a pool and mixed with a static mixer within a liquefier tube to a substantially uniform composition such that the printed part has the physical properties that are substantially that of the neat elastomeric material.

The neat elastomeric material has a Shore A hardness or durometer of less than 80 and more particularly a Shore A hardness of between 65 and 75. However, elastomeric materials with a Shore A less than 65 are also within the scope of the present disclosure. The durometer can be determined using the procedure set forth in ASTM D2240-00.

The present disclosure addresses many challenges related to the production of elastomeric filaments. Utilizing a polymer with a harder, non-elastomeric shell around an elastomeric core allows for more accurate and consistent filaments to be manufactured in a co-extrusion process. By way of non-limiting example, the harder non-elastomeric shell prevents manufacturing errors within the filament because the hardened shell does not stick to the extrusion die. The extruded core-shell filament has a substantially consistent diameter or width and length with a smooth outer surface. Extruding filaments of substantially all elastomeric material can result in a rough surface finish on the filament as well as inconsistent cross-sectional areas along the length of the filament due to the relatively low flexural modulus of elastomeric materials.

Utilizing the elastomeric core with a harder, non-elastomeric shell filament also addresses many challenges related to the feeding of filament to a liquefier and printing of parts with elastomeric properties. Elastomeric materials have high coefficients of friction which causes the filament to grip surfaces of a tube between the source of material and the print head, requiring the filament driver to exert more force on the filament. The exertion of more force can result in the stretching or otherwise improper feeding of the filament, and therefore, volumetric printing errors. The further the filament material travels away from the supply spool, the more it is subject to unwanted elongation and diameter change. Elastomeric materials may also become torn or abraded, for example due to penetration of filament drive wheels, and may litter small crumbs of rubbery material inside a filament drive assembly, causing filament drive performance issues.

Additionally, in fused deposition modeling 3D printing using filament consumable materials, the filament is used as a piston within a liquefier tube of a print head to force the molten material from an extrusion nozzle. Using the filament as a piston requires the filament to retain a substantially straight and rigid configuration between the filament drive mechanism and the pool of molten material that forms within the print head. Due to the softness of the elastomeric material, elastomeric filaments tend to buckle or compress and widen between the filament drive and the melt pool, which also results in printing errors due to a flow variation occurring due to lack of consistent pressure imparted on the melt pool.

Utilizing a shell of harder, non-elastomeric material around the elastomeric shell substantially reduces and/or eliminates many of the above-mentioned issues. The hardened shell with a lower coefficient of friction engages the filament tube, which results in the filament sliding along the filament path. The hardened shell is engaged by the teeth of the drive gears, which prevents ripping and tearing and allows for consistent filament feeding and resulting flow of the melt pool. The hardened shell also provides sufficient rigidity or stiffness to prevent buckling or stretching between the filament drive and the melt pool.

The disclosed hardened, non-elastomeric shell around the elastomeric material provides for a more accurate part build relative to a monofilament having an elastomeric matrix. However, the hardened non-elastomeric shell and elastomeric core filament will retain the core-shell configuration through the extrusion process due to the laminar nature of the flow of molten material within the liquefier tube and through the extrusion nozzle, unless a mixing force is applied. The laminar flow of the elastomeric core and the harder, non-elastomeric shell material through a plug-flow liquefier results in extruded roads where the elastomeric material is encased in the harder, non-elastomeric shell material. Without turbulence or disruption of the core and shell configuration, the firmness of the shell material will dictate the overall hardness of the part being printed, resulting in a loss of the desired elastomeric properties in the part, even though the core may contain a majority of elastomeric material. In addition, with two differing materials being deposited, without additional processing, part distortion may occur due to shrinkage of the materials upon cooling.

The present disclosure recognizes and solves the aforesaid issue by positioning a static mixer within the liquefier tube such that the material exiting the nozzle is substantially uniform in material distribution and mixing so that a core and shell configuration no longer remains. Exemplary properties for the static mixer include a small footprint, simple design, rapid mixing capability and low pressure drop; in this example, the configuration of the liquefier tube and drive do not need to be modified to accommodate the static mixer. Additionally, the volume percent of the hardened, non-elastomeric shell relative to the volume percent of the elastomeric core is sufficiently small that when the non-elastomeric shell material is mixed within the elastomeric core material, the extruded material has the physical properties substantially that of the neat elastomeric material.

FIG. 1 is a schematic front view of an exemplary additive manufacturing system 10. As shown in FIG. 1, system 10 is an extrusion-based additive manufacturing system for printing 3D parts and support structures using a layer-based, additive manufacturing technique, where the 3D part can be printed from part material and support structures can be printed from support material. Suitable extrusion-based additive manufacturing systems for system 10 include fused deposition modeling systems developed by Stratasys, Inc., Eden Prairie, MN under the trademark "FDM".

In the illustrated embodiment, system 10 includes chamber 12, platen 14, platen gantry 16, an extrusion head or print head 18, head gantry 20, and consumable assemblies 22 and 24. Chamber 12 is an enclosed environment that contains platen 14 and any printed parts. Chamber 12 can be heated (e.g., with circulating heated air) to reduce the rate at which the part and support materials solidify after being extruded and deposited. In alternative embodiments, chamber 12 can be omitted and/or replaced with different types of build environments. For example, parts can be built in a build environment that is open to ambient conditions or may be enclosed with alternative structures (e.g., flexible curtains).

Platen 14 is a platform on which printed parts and support structures are printed in a layer-by-layer manner. In some embodiments, platen 14 may also include a flexible polymeric film or liner on which the printed parts and support structures are printed. In the illustrated example, print head 18 is a dual-tip extrusion head configured to receive consumable filaments from consumable assemblies 22 and 24 (e.g., via feed tube assemblies 26 and 28) for printing 3D part 30 and support structure 32 on platen 14. Consumable assembly 22 may contain a supply of a part material, such as a high-performance part material, for printing printed part 30 from the part material. Consumable assembly 24 may contain a supply of a support material for printing support structure 32 from the given support material.

Platen 14 is supported by platen gantry 16, which is a gantry assembly configured to move platen 14 along (or substantially along) a vertical z-axis. Correspondingly, print head 18 is supported by head gantry 20, which is a gantry assembly configured to move print head 18 in (or substantially in) a horizontal x-y plane above chamber 12. In an alternative embodiment, platen 14 may be configured to move in the horizontal x-y plane within chamber 12 and print head 18 may be configured to move along the z-axis. Other similar arrangements may also be used such that one or both of platen 14 and print head 18 are moveable relative to each other over a desired number of degrees of freedom. Platen 14 and print head 18 may also be oriented along different axes. For example, platen 14 may be oriented vertically and print head 18 may print printed part 30 and support structure 32 along the x-axis or the y-axis.

The print head 18 can have any suitable configuration. A print head used with a fused deposition additive manufacturing system typically utilizes a liquefier assembly comprising a liquefier comprised of a liquefier tube and an extrusion tip, such as is disclosed in Swanson et al. U.S. Pat. No. 6,004,124. A heater such as a heating block or a heating coil is positioned about the liquefier tube to create a melt zone region within a lower longitudinal region of the liquefier where a filament feedstock is heated and melted to form a melt pool. As filament is driven into an inlet of the liquefier, molten material from the melt pool is extruded through an extrusion tip fixed at an outlet of the liquefier. The liquefier tube is typically cylindrical for receiving round filament feedstocks, but may alternatively may have a rectangular or other cross-sectional geometry configured to receive a ribbon filament or other geometries of filament. Examples of suitable devices for print head 18, and the connections between print head 18 and head gantry 20 include those disclosed in Crump et al., U.S. Pat. No. 5,503,785; LaBossiere, et al., U.S. Pat. Nos. 7,384,255 and 7,604,470; Leavitt, U.S. Pat. No. 7,625,200; Batchelder et al., U.S. Pat. No. 7,896,209; Comb et al., U.S. Pat. No. 8,153,182; Leavitt, U.S. Pat. No. 7,625,200; Swanson et al., U.S. Pat. Nos. 8,419,996 and 8,647,102; Batchelder U.S. Pat. No. 8,926,882; and Barclay et al. U.S. Published Patent Application 20180043627. In one example, during a build operation, one or more drive mechanisms, such as drive mechanism 19, are directed to intermittently feed the modeling and support materials (e.g., consumable filaments via feed tube assemblies 26 and 28) through print head 18 from supply sources 22 and 24.

System 10 also includes controller 34, which can include one or more control circuits configured to monitor and operate the components of system 10. For example, one or more of the control functions performed by controller 34 can be implemented in hardware, software, firmware, and the like, or a combination thereof. Controller 34 can communicate over communication line 36 with chamber 12 (e.g., with a heating unit for chamber 12), print head 18, and various sensors, calibration devices, display devices, and/or user input devices.

System 10 and/or controller 34 can also communicate with computer 38, which can include one or more discrete computer-based systems that communicate with system 10 and/or controller 34, and may be separate from system 10, or alternatively may be an internal component of system 10. Computer 38 includes computer-based hardware, such as data storage devices, processors, memory modules, and the like for generating and storing tool path and related printing instructions. Computer 38 may transmit these instructions to system 10 (e.g., to controller 34) to perform printing operations.

A digital model representative of a 3D part to be printed can be created, such as by scanning an existing 3D object to create a digital image file, or such as by drawing a 3D model using a computer-aided design (CAD) program. The digital model and/or instructions for printing the model can be loaded into computer 38. The computer 38 can communicate with controller 34, which serves to direct the system 10 to print the 3D part 30 and optionally, a support structure 32. Part material is deposited in layers along toolpaths that build upon one another to form the 3D part 30.

Figure 2:
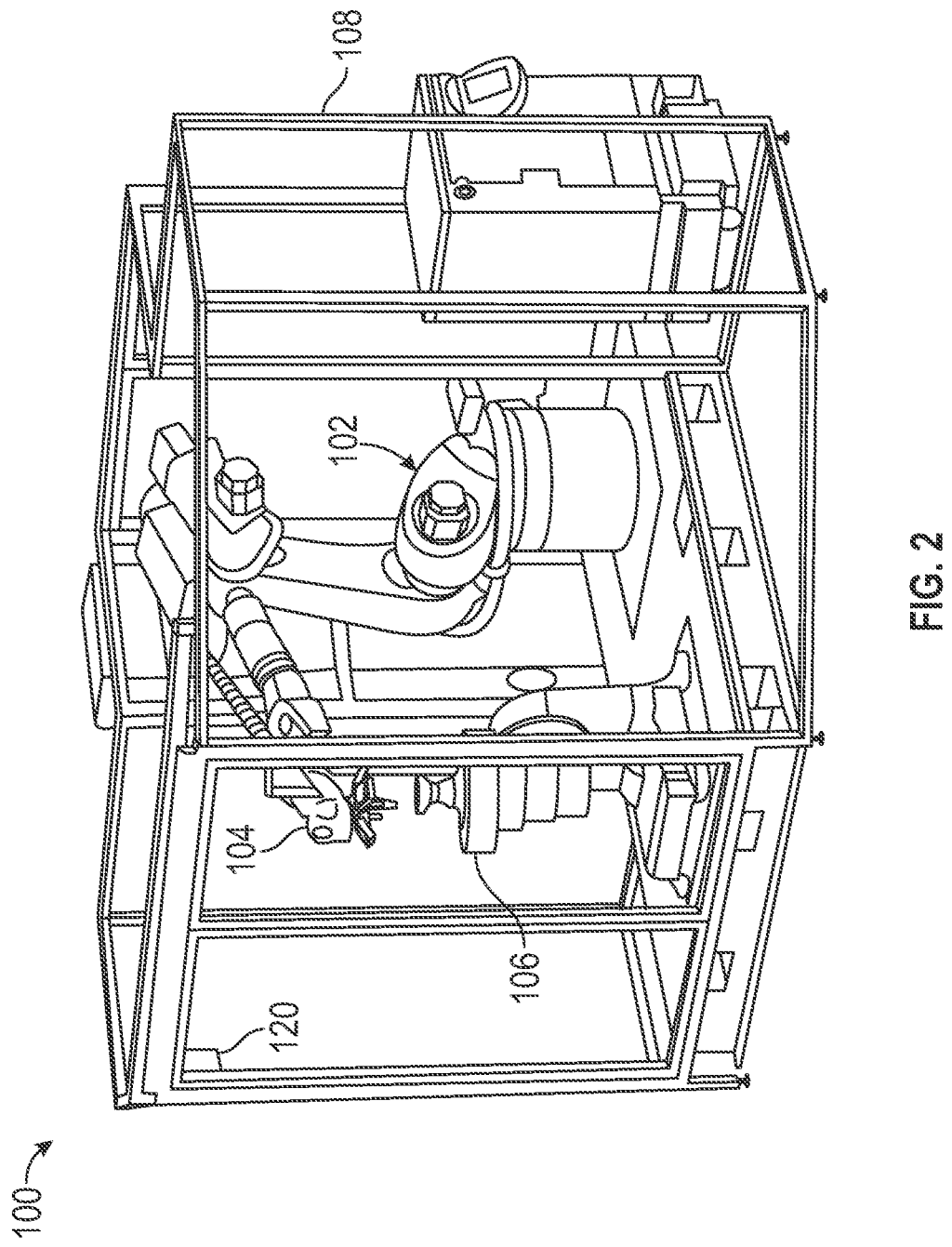
FIG. 2 is a schematic view of exemplary robotic additive manufacturing system configured to print parts with the use of consumable materials of the present disclosure.

FIG. 2 is a perspective view of a multi-axis robotic build system 100 that may be used for building 3D parts utilizing two-dimensional tool paths, three-dimensional tool paths and combinations thereof. System 100 includes in one embodiment a robotic arm 102 capable of movement along six axes. An exemplary robotic arm is an industrial robot manufactured by KUKA Robotics of Augsburg, Germany. While six axes of motion are discussed for the robotic arm 102 from a stationary base, it should be understood that additional axes or other movements are also amenable to use with the embodiments of the present disclosure, without departing therefrom. For example, the robotic arm 102 could be mounted to move on a rail or a gantry to provide additional degrees of freedom. The robotic arm 102 carries a print head 104, such as, by way of example only and not by way of limitation, a print head similar to print head 18 described above, for printing parts from a filament feedstock. A build platform 106 is provided, which in one embodiment is movable along two axes of rotation, rotation about the z-axis, and tilting (rotation) about the x-axis. A controller 108 contains software and hardware for controlling the motion of the robotic arm 102 and the build platform 106, as well as the printing operation of the print head 104. The system 100 optionally may be housed within a build structure 120.

A generated tool path is utilized to control motion of the robotic arm 102. However, control of the extrusion head is also used to accurately deposit material along the generated tool path. For example, one embodiment of the present disclosure synchronizes timing of the motion of the robotic arm 102 with print head 104 to extrusion from the print head 104. Embodiments of the present disclosure provide for speed up or slowdown of printing, changing the extrusion rate in conjunction with robotic movements, tip cleaning, and other actions of the print head 104 based on the generated tool path and motion of the robotic arm 102. As an example, extrusion from the print head 104 may be synchronized with motion of the robotic arm 102 in manners taught by Comb et al. U.S. Pat. No. 6,054,077; and Comb U.S. Pat. Nos. 6,814,907, 6,547,995, and 6,814,907.

As mentioned above, flow of material is laminar in a liquefier tube, and is primarily plug flow, due to its relatively low flow rate and high viscosity. When utilizing a core-shell filament in a laminar flow print head configuration, the extruded and printed roads retain the configuration of the shell around the core. When printing a part with a filament having an elastomeric core with a harder, non-elastomeric shell, the extruded roads will retain a hard shell around an elastomeric core, which will adversely affect the desired viscoelastic properties of the part being printed (e.g. the part properties will be closer to that of the shell, not the core).

The present disclosure addresses the laminar flow properties of a core-shell molten material by positioning a mixer within the print head and utilizing the mixer to blend the core and shell materials once the filament has been heated to a molten state. Due to the relatively lesser proportion of shell material, the blended material exiting the extrusion port has elastomeric properties when cooled that are substantially similar to that of a neat elastomeric material.

Figure 3:
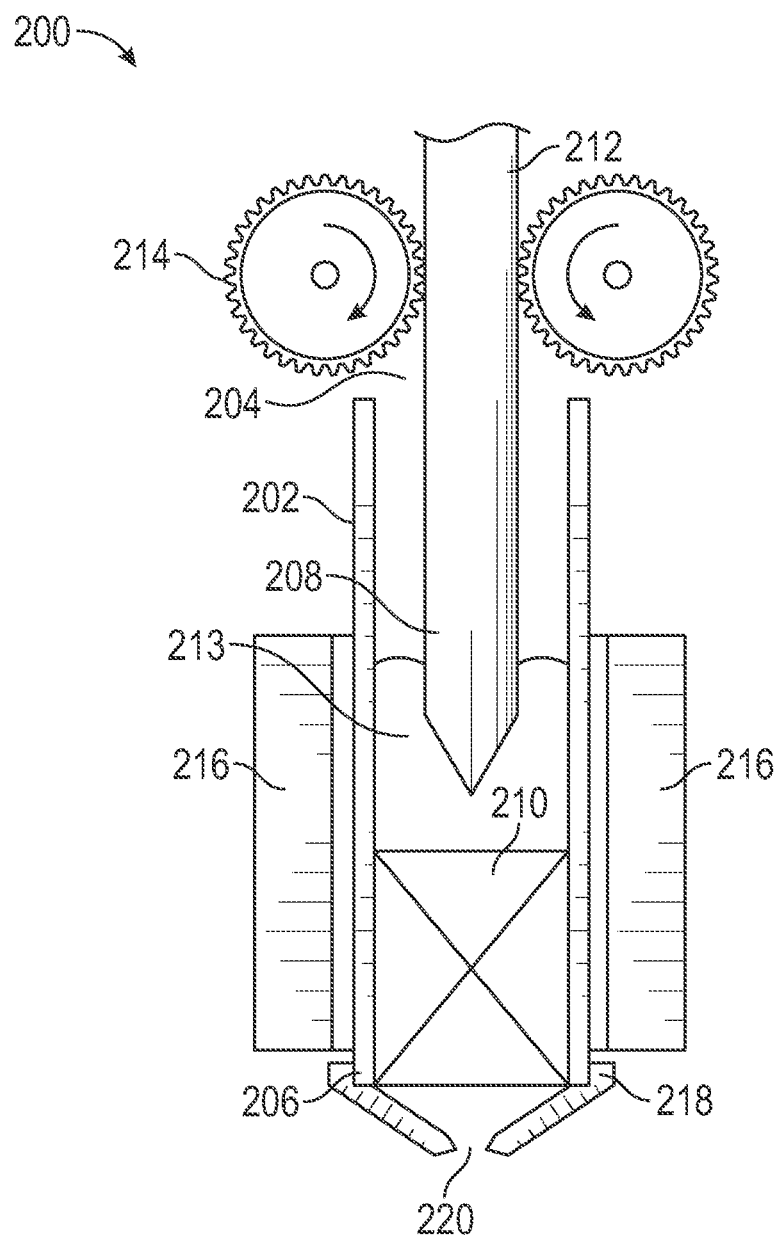
FIG. 3 is a schematic view of a print head of the present disclosure.

Referring to FIG. 3, a static mixer 210 is positioned within a flow channel 208 of a liquefier tube 202 of a print head 200

(which can be utilized in in print head 18 of system 10 and print head 104 of system 100). A filament 212 is forced into the flow channel 208 though a an inlet 204 of the liquefier tube 202 with a drive mechanism 214. The filament 212 is heated with a heating element 216 in a lower portion of the liquefier tube 202 to form a melt pool 213 which is extruded from an extrusion port 220 in a nozzle 218 attached to an outlet 206 of the liquefier tube 202. The static mixer 210 is positioned proximate the outlet 206 of the liquefier tube 202 and mixes the core material and the shell material to a substantially uniform composition that exits the extrusion port 220.

The static mixer 210 has a small footprint, fixed-geometry, minimized pressure drop and maximized mixing capability. For instance, if the static mixer 210 is relatively long, then the filament must be melted in a higher location in the liquefier tube 202 to prevent solid material from engaging the static mixer 210. The static mixer 210 also has a high mixing rate for a relatively low flow to ensure the low-profile static mixer 210 sufficiently mixes the core and shell materials together such that the extruded material is substantially uniform. If the mixing rate is not sufficiently high, then the material extruded from the extrusion port 220 will have varying physical properties which will result in parts with unwanted variations in physical properties, including thermal expansion and strength.

Additionally, the pressure drop across the static mixer 210 should be minimized to maintain a typical flow rate through the extrusion port 220 while utilizing the drive mechanism 214. If the pressure drop across the static mixer 210 is substantially high, the drive mechanism 214 may not have the necessary power to maintain a desired flow rate for printing the part.

An exemplary static mixer 210 is sold under the SMX designation by Sulzer Ltd. located in Winterthur, Switzerland. However, any static mixer that provides high mixing rates of low flow or laminar flow materials without significant pressure drop can be utilized.

While a static mixer is described herein, dynamic mixers can also be utilized to perform the function of mixing the molten core and shell materials in the print head in accordance with the present invention. Alternative embodiments also include using a screw pump to mix the core and shell material within the print head.

The volume of non-elastomeric, polymeric shell material relative to the elastomeric core is balanced to so that the shell will provide the necessary stiffness to unreel easily off a filament spool, without appreciable elongation, and pass through a filament drive system without any substantial deformation, stretching, distortion, spalling, or crumbling. Yet, when core and shell are melted and mixed together in an extruder, the amount of shell does not substantially affect the viscoelastic properties of the elastomeric material. Knowing the cross-sectional geometry of the filament, the cross-sectional area of the filament, the flexural modulus of the elastomeric core material and the harder, non-elastomeric shell material, and the minimum stiffness of the filament required to be wound onto a spool and also handled within an extrusion-based additive manufacturing system, then the volume of the non-elastomeric shell material required for the necessary stiffness can be empirically determined.

The selection of pairs of materials for core and shell is made based on chemical composition such as using the same monomer chemistries along with performance requirements. In FDM® 3D printing with unfilled plastics, a critical material behavior is low-shrinkage. This characteristic is found in weakly-crystalline and amorphous materials. Many low-durometer thermoplastic elastomers which constitute the "core" exhibit this behavior. This is not necessarily the case with harder, non-elastomeric polymers that constitute the "shell". The basic challenge is to match a weakly-crystalline or amorphous shell polymer with a core material that is melt-compatible. Addition of a compatible shell material up to an estimated 20 wt. % can be utilized to create a more rigid filament material. The shell compatibility refers not only to the ability for the shell to initially adhere to the core during filament production, but also to the ability to evenly mix without materially affecting the elastomeric properties of the core material.

The stiffness k of a filament of a single material is determined by the following equation:

$$k = EI \qquad \text{(Equation 1)}$$

where E is the flexural modulus of the material and I is the area moment of inertia. The moment of inertia for a filament is a geometrical property of cross-sectional area which reflects how its points are distributed with regard to a longitudinal axis.

The stiffness of the core shell filament is calculated by the following formulas:

$$k_{total} = k_{core} + k_{shell} \qquad \text{(Equation 2)}$$

Substitution Equation 1 into Equation 2, results in the following formula $$k_{total} = E_{core} I_{core} + E_{shell} I_{shell} \qquad \text{(Equation 3)}$$

Equations 1-3 illustrate that the stiffness of any configuration of a filament having a core-shell configuration can be empirically calculated. Knowing a minimum stiffness threshold necessary for extrusion based additive manufacturing allows the volume of the shell to be optimized such that the stiffness of the filament exceeds the minimum stiffness threshold while minimizing the volume of the shell material so as to minimize the dilution effect of the shell material on the elastomeric properties of the part being printed.

Figure 4:
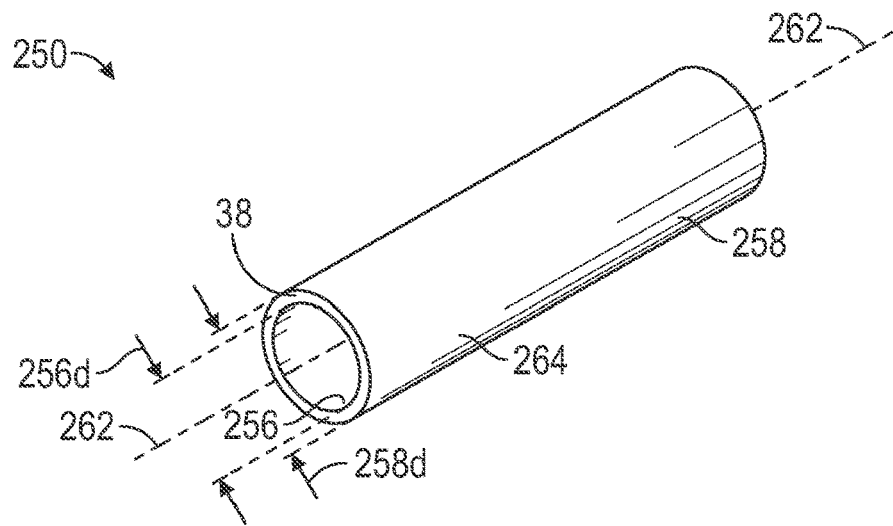
FIG. 4 is a perspective view of a segment of a consumable filament of the present disclosure, where the consumable filament includes a core portion and a shell portion.

FIG. 4 illustrates a segment of filament 250 with a cylindrical geometry that includes elastomeric core portion 256 and harder shell portion 258, which extends along length 260. Core portion 256 is located around central axis 262, and shell portion 258 is concentric with the core portion 256 and forms outer surface 264. Core portion 256 compositionally includes an elastomeric material and shell portion 258 compositionally includes a second, non-elastomeric polymeric material that is substantially miscible with the elastomeric material wherein the shell material has a higher flexural modulus relative to the flexural modulus of the elastomeric core material.

Filament 250 may be manufactured with a co-extrusion process, where the core and shell materials may be separately compounded and co-extruded to form filament 250. Alternatively, the filament may be coated with a shell after extrusion of the core. While core portion 256 and shell portion 258 are illustrated in FIG. 4 as having a defined interface, it is understood that the core and shell materials may at least partially inter-diffuse at this interface due to the co-extrusion process and the miscibility of the materials. After formation, filament 250 may be wound onto a spool or be otherwise wound into a feedable configuration and packaged for use with system 10 or 100.

When a cross-section of the cylindrical filament is taken substantially normal to the central axis, core portion 256 has an outer diameter referred to as core diameter 256*d*, and shell portion 258 has an outer diameter referred to as shell diameter 258d, where shell diameter 258d also corresponds to the outer diameter of filament 250. The relative dimensions for shell diameter 258d to core diameter 256d are desirably selected such that the amount of the shell material provides the necessary stiffness for the filament 250 to process the feedstock through an extrusion-based additive manufacturing system while not substantially affecting the physical properties of the part printed in a layer-wise manner.

When utilizing a cylindrical filament, the moment of inertia I is a function of the diameter to the fourth power ($I=f(d^4)$) while area is a function of the diameter squared ($A=f(d^2)$). As such, a filament can be manufactured that can be utilized in an extrusion-based additive manufacturing system with a relatively stiff shell around a soft core, where the high modulus shell is a relatively small volume fraction that is miscible with the core.

For the core 256, the moment of inertia is calculated by the following formula:

$$I = \frac{\pi D^4}{64} \quad \text{(Equation 4)}$$

where d is core diameter 256d.

For the shell 138, the moment of inertial is calculated by the following formula:

$$I = \frac{\pi(D_o^4 - D_i^4)}{64} \quad \text{(Equation 5)}$$

where $D_o$ is the outer diameter 258d and $D_i$ is the diameter of the core 256d.

The area of the core 256 is calculated by the following formula:

$$A = \frac{\pi d^2}{4} \quad \text{(Equation 6)}$$

where d is core diameter 256d.

The area of the shell 258 is calculated by the following formula:

$$A = \pi(D_o^2 - D_i^2)/4 \quad \text{(Equation 7)}$$

where $D_o$ is the outer diameter 258d and $D_i$ is the diameter of the core 256d.

The cross-sectional ratio of the shell to the core is calculated by the following formula:

$$A_{ratio}=(\pi D_o^2-\pi D_i^2)/\pi D_i^2 \quad \text{(Equation 8)}$$

Because the stiffness is a function of the diameter to the fourth power ($I=f(d^4)$) while area is a function of the diameter squared ($A=f(d^2)$) for a cylindrical filament, a relatively thin shell can provide the necessary stiffness, while not significantly affecting the elastomeric properties of the material when mixed.

Once material pairings are determined, the flexural modulus for each material is known. Further, the outer dimension of the filament, $D_o$ for a cylindrical filament is known based upon the operating specifications of an particular extrusion based additive manufacturing system. The variable that is adjusted is the diameter of the core $D_i$ to determine the dimensions of the core 256 and the shell 258 that exceed the minimum stiffness threshold for a particular extrusion based additive manufacturing system and minimize the volume of the shell material.

Melt compatibility of shell and core can be estimated by chemical composition. To achieve adequate chemical compatibility between core and shell, compositions are selected from a common monomer chemistry. By way of non-limiting example, the core and shell can be selected from polyurethane-based pairs, polyamide pairs, polyester-based pairs, vulcanate pairs, styrenic elastomer pairs, and so on.

Non-limiting and exemplary pairings of elastomeric core materials and non-elastomeric shell materials for different types of polymeric materials are found in Table 1, which is below.

TABLE 1

| Material Type | Core Material | Flexural Mod. (PSI) | Shell Material | Flexural Mod. (PSI) |
|---|---|---|---|---|
| Pairing urethane chemistry with urethane: | | | | |
| Thermoplastic polyurethane | Irogran A 92 P 4647 | 6,250 | Isoplast 101 | 260,000 |
| Thermoplastic polyurethane | Irogran A 92 P 4647 | 6,250 | Tecoplast TP-470 | 300,000 |
| Thermoplastic polyurethane | Tecothane TT-1077A | 1,100 | Tecoplast TP-470 | 300,000 |
| Pairing PA with PA: | | | | |
| Polyamide - PA6 based shell | Pebax 5513 | 25,000 | Grivory G16 or G21 or G25 | 1,200,000 |
| Polyamide - PA6 based shell | Pebax 5513 | 25,000 | Novadyn DT/DI | 435,000 |
| Polyamide - PA 11 based shell | Pebax Rnew 25R53 | 4,000 | Rilsan Clear G 820 Renew | 210,000 |

TABLE 1-continued

| Material Type | Core Material | Flexural Mod. (PSI) | Shell Material | Flexural Mod. (PSI) |
|---|---|---|---|---|
| Polyamide - PA 11 based shell | Pebax Rnew 25R53 | 4,000 | PA11 | 160,000 |
| Polyamide - PA 12 based shell | Pebax 2533 | 3,500 | Grilamid TR 90 | 87,000 |
| Polyamide - PA 12 based shell | Pebax 2533 | 3,500 | Rilsan Clear G170 | 232,000 |
| Polyamide - PA 12 based shell | Pebax 2533 | 3,500 | PA 12 | 210,000 |
| Polyamide - PA 12 based | Vestamid E40-53 | 11,600 | Grilamid TR 90 | 232,000 |
| Polyamide - PA 12 based | Vestamid E40-53 | 11,600 | Rilsan Clear G170 | 210,000 |
| Polyamide - PA 12 based | Vestamid E40-53 | 11,600 | PA 12 | |
| Polyamide - Amorphous | Pebax Clear 300 | 30,700 | Grilamid TR 90 | 232,000 |
| Polyamide - Amorphous | Pebax Clear 300 | 30,700 | Rilsan Clear G170 | 287,000 |
| Polyamide - Amorphous | Pebax Clear 300 | 30,700 | Rilsan Clear G 820 Renew | 236,000 |
| Polyamide - Amorphous | Pebax Clear 300 | 30,700 | PA11 | 160,000 |
| Polyamide - Amorphous | Pebax Clear 300 | 30,700 | PA12 | 210,000 |
| Pairing polyester chemistry with polyester or polybutylene: | | | | |
| Thermoplastic copolyesters | Arnitel EL150 | N/A | Amorphous polyethylene terephthalate (APET) | 334,000 |
| Thermoplastic copolyesters | Arnitel EL150 | 2,000 | Amorphous polyethylene terephthalate glycol (PETG) | 320.000 |
| Thermoplastic copolyesters | Arnitel EL150 | 2,000 | Copolyesters | 225,000 |
| Thermoplastic copolyesters | Arnitel EL150 | 2,000 | Crastin 6131 poly(butylene terephthalate) (PBT) | 378,000 |
| Pairing vulcanates with polyolefins: | | | | |
| Thermoplastic Vulcanates | Santoprene 101-55 | N/A | Topas 9506F-04 | N/A |
| Pairing styrenic with styrenic: | | | | |
| Styrenic elastomer | Styroflex 2G66 | 20,300 | Polystyrene (PS) | 480,000 |

Irogran is a trademark of Huntsman International LLC located in Salt Lake City, Utah. Isoplast, Tecoplast and Tecothane are trademarks of Lubrizol Advanced Materials, Inc. located in Cleveland, Ohio. Pebax and Rilsan are trademarks of Arkema Corporation located in Colombes, France. Grivory and Grilamid are trademarks of EMS-Chemie, Inc. located in Sumter, South Carolina. Novadyn is a trademark of Invista North America S.a.r.l. located in Wichita, Kans. Vestamid is a trademark of Evnik Degussa GMBH located in Essen, Germany. Arnitel is a trademark of DSM N.V. located in Heerlen, Netherlands. Santoprene is a trademark of Exxon Mobil Corporation located in Irving, Tex. Topas is a trademark of Topas Advanced Polymers GMBH located in Frankfurt, Germany.

The ratio of flexural moduli of the shell to the core in Table 1 ranges from at least about 5:1 to about 270:1. As such, a relatively small amount of shell material can significantly affect the overall stiffness of the filament and exceed the minimum stiffness threshold. Depending upon the types of materials utilized, the volume percent of the shell ranges from about 1 volume % to about 30 volume %, and volume percent of the core ranges from about 70 volume % to about 99 volume %. More particularly, the volume percent of the shell ranges from about 5 volume % to about 25 volume %, and volume percent of the core ranges from about 75 volume % to about 95 volume %. In some instances, the volume percent of the shell ranges from about 10 volume % to about 20 volume %, and volume percent of the core ranges from about 80 volume % to about 90 volume %.

For a cylindrical filament with a nominal 1.75 mm (0.07 in.) diameter, the thickness of the shell is as follows in Table 2 based upon the volume percent of the shell.

TABLE 2

| Volume % of Shell | Thickness (in.) |
|---|---|
| 1 | 0.0003 |
| 5 | 0.0017 |
| 10 | 0.0036 |
| 20 | 0.0074 |
| 25 | 0.0094 |
| 30 | 0.0114 |

The use of cross-sectional areas, area moment of inertias and flexural moduli for pairs of materials can also be utilized to determine the amount of core material for filament geometries other than cylindrical geometries. Non-limiting cross-sectional configurations of filament geometries include non-cylindrical geometries including oval, rectangular, triangular, star-shaped, square and the like.

Figure 5:
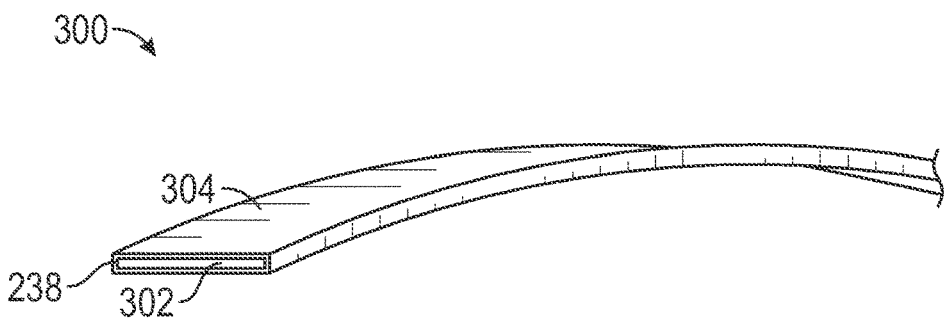
FIG. 5 is a perspective view of a segment of another consumable filament of the present disclosure, where the consumable filament includes a core portion and a shell portion

For example, as shown in FIG. 5, filament 300 has a core-shell configuration similar to filament 250, as illustrated in FIG. 4. As illustrated in FIG. 5, filament 300 includes a non-cylindrical cross-sectional geometry with core portion 302 and shell portion 304 each having a rectangular cross-sectional geometry. Examples of suitable materials for core portion 302 and shell portion 304 include those disclosed in Table 1.

Figure 6:
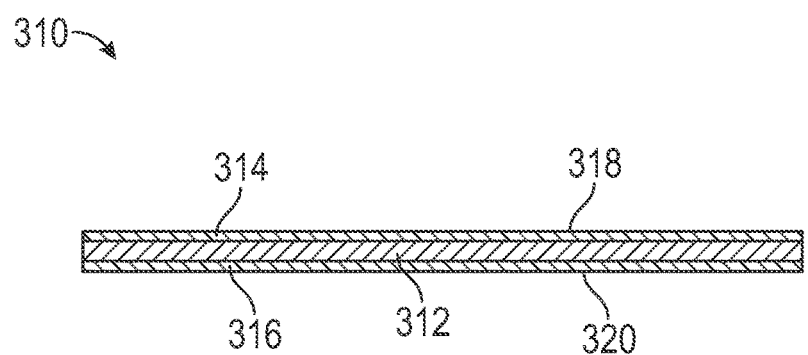
FIG. 6 is a perspective view of a segment of another consumable filament of the present disclosure, where an interior layer is compositionally an elastomeric material.

FIG. 6 illustrates a layered configuration of a filament 310 having a rectangular cross-sectional geometry. The filament includes an elastomeric middle portion 312 and harder miscible material bonded to the longer sides surfaces 314 and 316 in layers 318 and 320, respectively. The layers 318 and 320 provides the necessary stiffness for use in an extrusion based additive manufacturing system.

Figure 7:
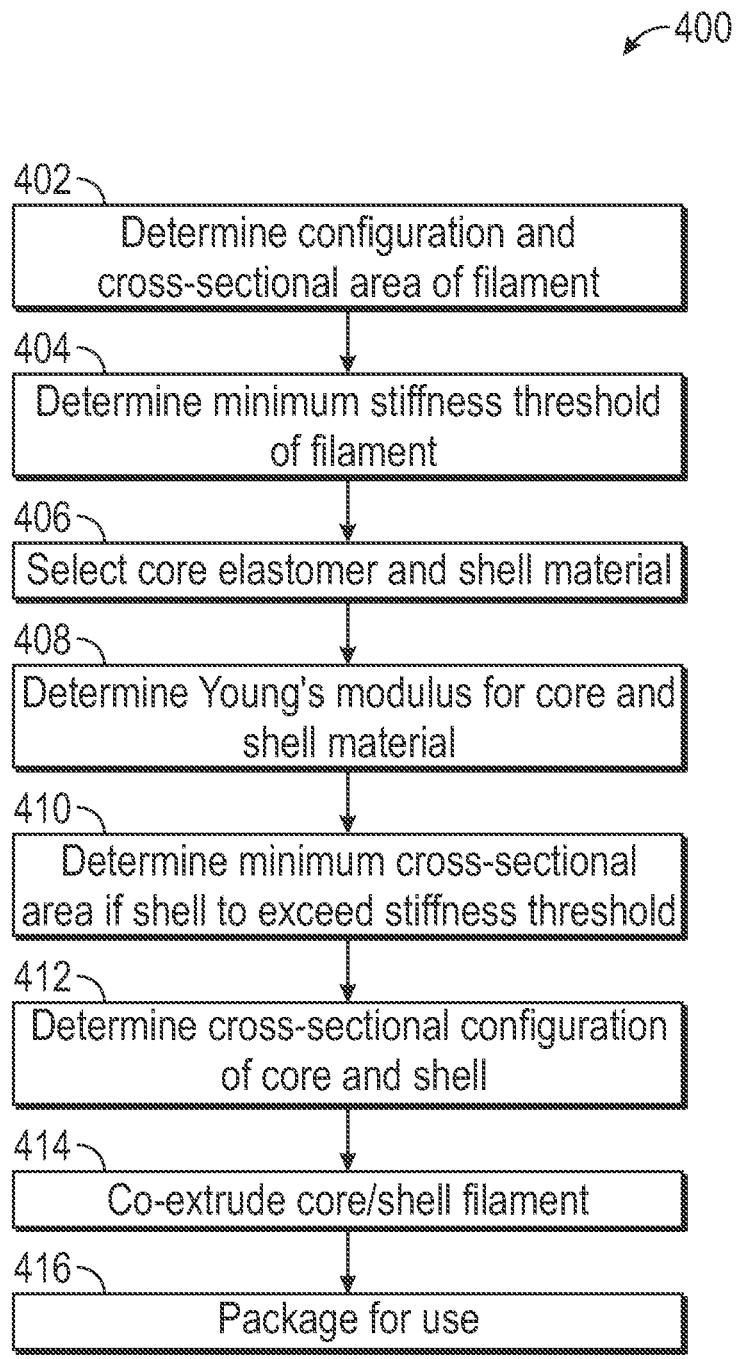
FIG. 7 is a flow chart of a method for the production of filament with an elastomeric core.

As discussed above, knowing the configuration of a filament, the desired materials of construction for a part and the minimum stiffness threshold allows a core-shell filament to be coextruded that allows parts to printed with elastomeric properties while still maintaining sufficient stiffness to be processed through an extrusion-based additive manufacturing system. A method 400 is illustrated in FIG. 7 that allows for the production of a filament with an elastomeric core that has sufficient stiffness to drive it into the extrusion system with consistency and without degradation or abrasion.

The method 400 includes determining the configuration and cross-sectional area of the filament at step 402. The method includes determining a minimum stiffness threshold at step 404. The core material and shell material are selected as a compatible pairing at step 406 and the Flexural modulus or each material is determined at step 408. A minimum area of the shell material is determined to exceed the minimum stiffness threshold utilizing the utilizing the moment of inertia for the core and shell along with the Flexural modulus for the core material and shell material at step 410. The cross-sectional configuration of the core and shell are determined at step 412. The filament is co-extruded at step 414 and packaged for use in system 10 or 100 at step 416.

EXAMPLES

The present disclosure is more particularly described in the following examples that are intended as illustrations only, since numerous modifications and variations within the scope of the present disclosure will be apparent to those skilled in the art.

Example 1

An increase in stiffness of thermoplastic based cylindrical filament having an elastomeric core with a harder shell was determined relative to a neat elastomeric cylindrical filament utilizing empirical data. The elastomeric core was assumed to have a flexural modulus of 30,000 psi and the shell material was assumed to have a flexural modulus of 500,000 psi. The filament was assumed to have a diameter of 0.12 inches and the core was assumed to have a diameter of 0.11 inches.

The area of the shell was calculated to be 0.0018 in.$^2$ and the area of the core was calculated to be 0.0095 in.$^2$. The area moment of inertia for the shell was calculated to be $2.99e^{-6}$ and the area moment of inertia for the core was calculated to be $1.76e^{-8}$. The area moment of inertia for a cylindrical filament of elastomeric material was calculated to be $1.02e^{-5}$.

The calculated stiffness of the shell was 1.50 and the stiffness of the core was calculated to be 0.005, resulting in the core-shell elastomer filament having a composite stiffness of 1.50. In comparison, the stiffness of a neat elastomeric filament was calculated to be 0.31 $lb_f$ per in$^2$.

As such, adding 16 volume percent of the shell material increases the stiffness by about a factor of 5. In the same fashion, adding a rigid shell also reduces filament elongation and enables filament to be driven through the drive assembly without stretching or diameter variation. The increased stiffness is above the minimum stiffness threshold that allows the filament to be utilized in an extrusion based additive manufacturing system, while the volume of shell material, when mixed with the elastomeric core material does not materially affect the elastomeric properties of the part being printed.

By manipulating the composition and amount of rigid shell as desired, the stiffness and elasticity can be improved on the overall filament by at least double.

Example 2

The stiffness of a polyurethane based filament was increased by overlaying a shell of a similar monomer chemistry over the core material. The elastomeric core was Tecothane TT-1077A having a flexural modulus of 1,100 psi and the shell material was Tecoplast TP-470 having have a flexural modulus of 300,000 psi. The filament was assumed to have a diameter of 0.12 inches and the core was assumed to have a diameter of 0.11 inches.

The area of the shell was calculated to be 0.0018 in.$^2$ and the area of the core was calculated to be 0.0095 in.$^2$. The area moment of inertia for the shell was calculated to be $2.99e^{-6}$ and the area moment of inertia for the core was calculated to be $1.76e^{-8}$. The area moment of inertia for a cylindrical filament of elastomeric material was calculated to be $1.02e^{-5}$.

The calculated stiffness of the shell was 0.897 and the stiffness of the core was calculated to be 0.00002, resulting in the core-shell elastomer filament having a composite stiffness of 0.897. In comparison, the stiffness of a neat elastomeric filament was calculated to be 0.011 $lb_f$ per in$^2$.

As such, adding 16 volume percent of the shell material increases the stiffness by a factor of over 80.

Example 3

The stiffness of a typical non-elastomeric feedstock material such as an ABS 1.75 mm (0.07 in.) diameter filament sold by Stratasys, Inc. located in Eden Prairie, Minn. under the brand name FDM® ABS-M30™ has a flexural modulus of about 320,000 psi. Using the Formula 4 to determine the moment of inertia for a filament having a 0.07 in. diameter results in a moment of inertia (I) of $1.12e^{-6}$. Inserting the moment of inertia into Formula 1 results in a stiffness of $0.377\ lb_f$ per $in^2$. It is known that the ABS-M30 has sufficient stiffness which provides more than sufficient stiffness to be easily fed through an extrusion-based additive manufacturing system having a typical feed path.

However, an elastomeric material has a much lower flexural modulus, for example, an elastomeric thermoplastic polyurethane 1.75 mm (0.07 in.) diameter filament offered by Stratasys, Inc. sold under the brand name FDM® TPU 92A. The elastomeric thermoplastic polyurethane has a Shore A hardness of 92 has a flexural modulus of about 3,700 psi. Using Formulas 4 and 1, the moment of inertial remains the same as above ($1.12e^{-6}$) and when multiplied by the flexural modulus the stiffness is $0.0044\ lb_f$ per $in^2$. The elastomeric thermoplastic polyurethane has sufficient stiffness to be utilized to print parts with elastomeric properties utilizing a F123™ Series 3D printers manufactured by Stratasys, Inc., taking care in minimizing pull force on the filament as it is routed into a print head. As such, a filament with a minimum stiffness of at least $0.0044\ lb_f$ per $in^2$ can be utilized in 3D printer.

Although the present disclosure has been described with reference to several embodiments, workers skilled in the art will recognize that changes may be made in form and detail without departing from the spirit and scope of the disclosure.

The invention claimed is:

1. A filament for use in an extrusion-based additive manufacturing system, the filament comprising:
   a core compositionally comprising an elastomeric core material having a flexural modulus of less than 31,000 psi and a durometer of less than 80 Shore A; and
   a shell covering the core and having a thickness t, the shell compositionally comprising a non-elastomeric thermoplastic shell material that is substantially miscible with the elastomeric core material and has the same monomer chemistry as the elastomeric core material, and wherein the non-elastomeric thermoplastic shell material has a flexural modulus that is at least five times greater than the flexural modulus of the elastomeric core material,
   wherein the shell provides sufficient stiffness to the filament such that filament can be utilized as a feedstock in the extrusion-based additive manufacturing system.

2. The filament of claim 1, wherein the flexural modulus of the shell is at least 10 times greater than the flexural modulus of the cores.

3. The filament of claim 1, having a stiffness that is greater than a stiffness of a non core-shell filament of neat elastomeric material having the same geometry by at least a factor of 5.

4. The filament of claim 1, wherein the filament has a cylindrical configuration.

5. The filament of claim 1, wherein the shell completely encases the core.

6. The filament of claim 1, wherein the filament has a non-cylindrical configuration having an aspect ratio ranging from about 2:1 to about 10:1.

7. The filament of claim 1, wherein the filament has a non-cylindrical configuration having an aspect ratio ranging from about 2:1 to about 5:1.

8. The filament of claim 1, wherein the filament has a diameter of approximately 0.070 inches and the shell thickness t is between about 0.0003 inches and about 0.0114 inches.

9. The filament of claim 6, wherein the shell sandwiches the core.

10. The filament of claim 1, wherein the shell comprises up to about 30 volume % of the total volume of the filament, and the core comprises the remainder.

11. The filament of claim 1, wherein the shell comprises up to about 20 volume % of the total volume of the filament, and the core comprises the remainder.

12. The filament of claim 1, wherein the shell comprises between about 10 volume % to about 20 volume % of the total volume of the filament, and the core comprises the remainder.

13. The filament of claim 1, wherein the core and the shell are selected from the group consisting of polyurethanes, polyamides, copolyesters, styrenics and vulcanates.

14. The filament of claim 1, wherein the core and the shell each comprises polyamides, wherein the polyamides are selected from the PA6, PA11, PA12 and amorphous polyamides.

15. The filament of claim 1, wherein the filament is cylindrical and has a stiffness of at least $0.0044\ lb_f$ per $in^2$.

16. The filament of claim 1, wherein the flexural modulus of the elastomeric core is less than 11,000 psi.

17. A part printed using the filament of claim 1, wherein an extruded material is substantially homogenous such that the part substantially has the elastomeric properties of the core material.

18. A method for building a three-dimensional object with an extrusion-based additive manufacturing system having an extrusion head, the method comprising:
   feeding a core-shell consumable filament to a print head, the filament having an elastomeric core and a non-elastomeric shell and covering the core, the shell compositionally comprising a non-elastomeric thermoplastic material that is substantially miscible with the elastomeric core, wherein the non-elastomeric thermoplastic material has a flexural modulus that is greater than a flexural modules of the elastomeric core by at least a factor of five;
   melting the fed core-shell consumable filament in the extrusion head to form a molten material;
   mixing the molten material to a substantially uniform composition within the print head; and
   depositing the molten material as extruded roads to form at least a portion of the part such that the part has elastomeric properties like that of the elastomeric core.

19. The method of claim 18, wherein mixing the molten material comprises passing the molten material through a static mixer within a liquefier tube of the print head to form the substantially uniform composition.

20. The method of claim 18, wherein the flexural modulus of the shell is at least 10 times greater than the flexural modulus of the cores.

21. The method of claim 18, wherein the core-shell filament has a stiffness that is greater than a stiffness of a non core-shell filament of neat elastomeric material having the same geometry by at least a factor of 5.

22. The method of claim 18, wherein the filament has a cylindrical configuration.

23. The method of claim 18, wherein the filament has a non-cylindrical configuration having an aspect ratio ranging from about 2:1 to about 10:1.

24. The method of claim 23, wherein the shell sandwiches the core.

25. The method of claim 18, wherein the shell comprises up to about 30 volume % of the total volume of the filament, and the core comprises the remainder.

26. The method of claim 18, wherein the shell comprises up to about 20 volume % of the total volume of the filament, and the core comprises the remainder.

27. The method of claim 18, wherein the shell comprises between about 10 volume % to about 20 volume % of the total volume of the filament, and the core comprises the remainder.

28. The method of claim 18, wherein the core and the shell are selected from the group consisting of polyurethanes, polyamides, copolyesters, styrenics and vulcanates.

29. The method of claim 18, wherein the core and the shell each comprises polyamides, wherein the polyamides are selected from the PA6, PA11, PA12 and amorphous polyamides.

\* \* \* \* \*